United States Patent
Jaegers et al.

(10) Patent No.: US 9,033,628 B1
(45) Date of Patent: May 19, 2015

(54) PAPER ROLL TRANSIT PAD

(71) Applicant: Hexacomb Corporation, Boise, ID (US)

(72) Inventors: Robert Edward Jaegers, Lake Zurich, IL (US); Kirk Kind, Tomahawk, WI (US); Kevin Arnold, New Haven, CT (US)

(73) Assignee: Hexacomb Corporation, Deerfield, IL (US)

( * ) Notice: Subject to any disclaimer, the term of this patent is extended or adjusted under 35 U.S.C. 154(b) by 0 days.

(21) Appl. No.: 14/054,589

(22) Filed: Oct. 15, 2013

Related U.S. Application Data

(60) Provisional application No. 61/785,442, filed on Mar. 14, 2013.

(51) Int. Cl.
*B60P 7/135* (2006.01)

(52) U.S. Cl.
CPC ........................................ *B60P 7/135* (2013.01)

(58) Field of Classification Search
CPC ............ B32B 2250/05; B32B 2250/26; B32B 2250/42; B32B 2439/00; B32B 2553/00; B32B 29/005; B32B 29/08; B32B 7/12; D21H 27/10; D21H 27/30; B60P 7/135; F04B 27/1072; Y10S 206/814; B65D 19/0026; B65D 2519/00019; B65D 2519/00054; B65D 19/00273; B65D 2519/00288; B65D 2519/00303; B65D 2519/00323; B65D 2519/00333; B65D 2519/00557; B65D 2519/00562; B65D 2519/0086
USPC ............................................ 410/47, 121, 154
See application file for complete search history.

(56) References Cited

U.S. PATENT DOCUMENTS

| | | | | |
|---|---|---|---|---|
| 4,195,732 A | * | 4/1980 | Bell | 206/391 |
| 4,865,889 A | * | 9/1989 | Boyse | 428/12 |
| 5,374,464 A | * | 12/1994 | Jacobsen et al. | 428/100 |
| 5,413,823 A | | 5/1995 | Lo Presti et al. | |
| 5,413,824 A | * | 5/1995 | Van Erden | 428/12 |
| 5,433,156 A | * | 7/1995 | Hutchison | 108/51.3 |
| 5,678,968 A | * | 10/1997 | Bourgeois et al. | 410/119 |
| 8,308,411 B2 | * | 11/2012 | Funk et al. | 410/154 |
| 2006/0207481 A1 | | 9/2006 | McCarthy | |
| 2011/0195231 A1 | | 8/2011 | Lai et al. | |

OTHER PUBLICATIONS

"BNSF Intermodal Loading Guide, Load and Ride Solutions," BNSF Railway, 168pp. (At least as early as Dec. 2011. Retrieved Feb. 2013).
"Driver's Handbook on Cargo Securement, A Guide to the North American Cargo Securement Standard," 141pp. (Nov. 2003).

(Continued)

*Primary Examiner* — Glenn Dayoan
*Assistant Examiner* — Sunsurraye Westbrook
(74) *Attorney, Agent, or Firm* — Klarquist Sparkman, LLP

(57) ABSTRACT

The present disclosure relates to methods and devices for securing cylindrical goods in containers during transportation. Some embodiments include void fillers configured to restrain motion of objects in freight containers. Some embodiments include methods of fabricating void fillers for use in freight containers. Some embodiments include methods of using void fillers to restrain object motion in freight containers. In some cases, a void filler is fabricated from a honeycomb-style cardboard materials. In some cases, a void filler is used to restrain an upright cylindrical item such as an upright paper roll in a freight container.

14 Claims, 5 Drawing Sheets

(56) References Cited

OTHER PUBLICATIONS

Edgewise Compressive Strength of Corrugated Fiberboard (Short Column Test), T811om-11, TAPPI, 6pp. (Sep. 2011).

"Intermodal Loading Guide for Paper Products in Closed Trailers and Containers," Circular No. 43-D, Pamphlet No. 45, Association of American Railroads, 111pp. (Aug. 2001).

"Ring Crush of Paperboard," T818om-87, TAPPI, 2pp. (Jun. 1987).

"Ring Crush of Paperboard (Rigid Support Method)," T822om-93, TAPPI, 3pp. (May 1993).

"Ring Crush of Paperboard (Rigid Support Method)," T822om-11, TAPPI, 5pp. (Sep. 2011).

* cited by examiner

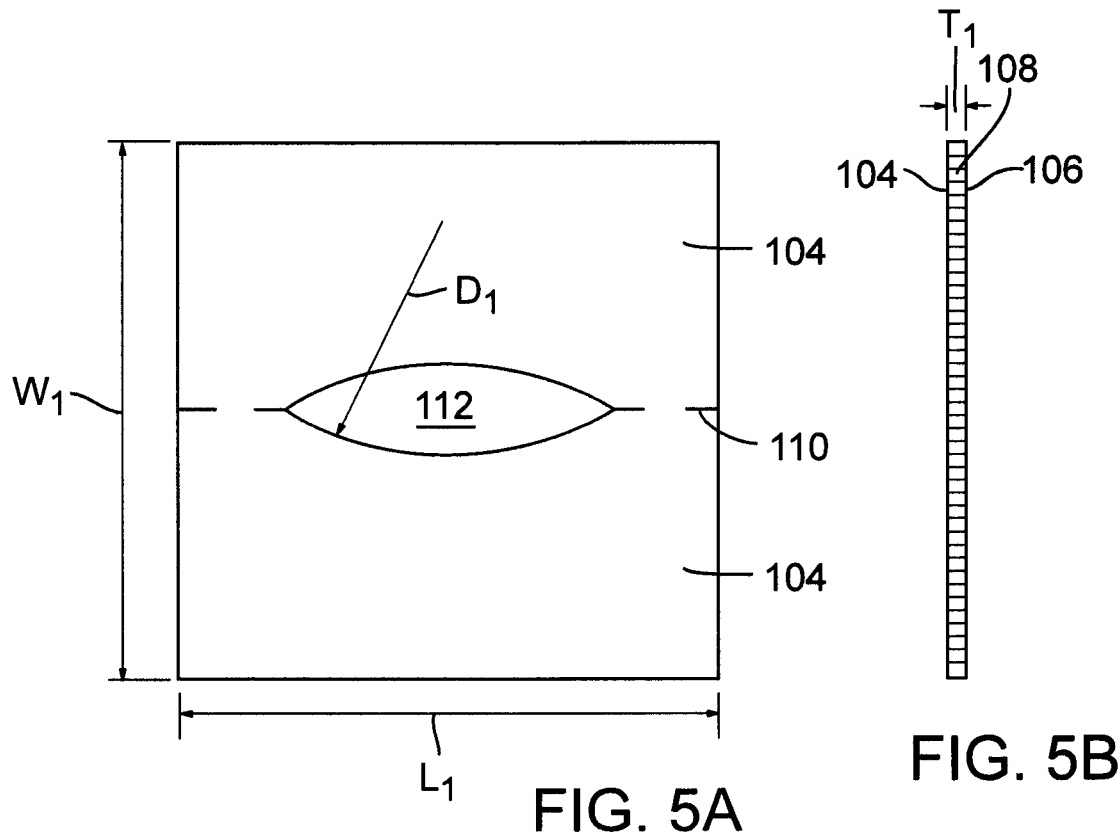
FIG. 5A
FIG. 5B
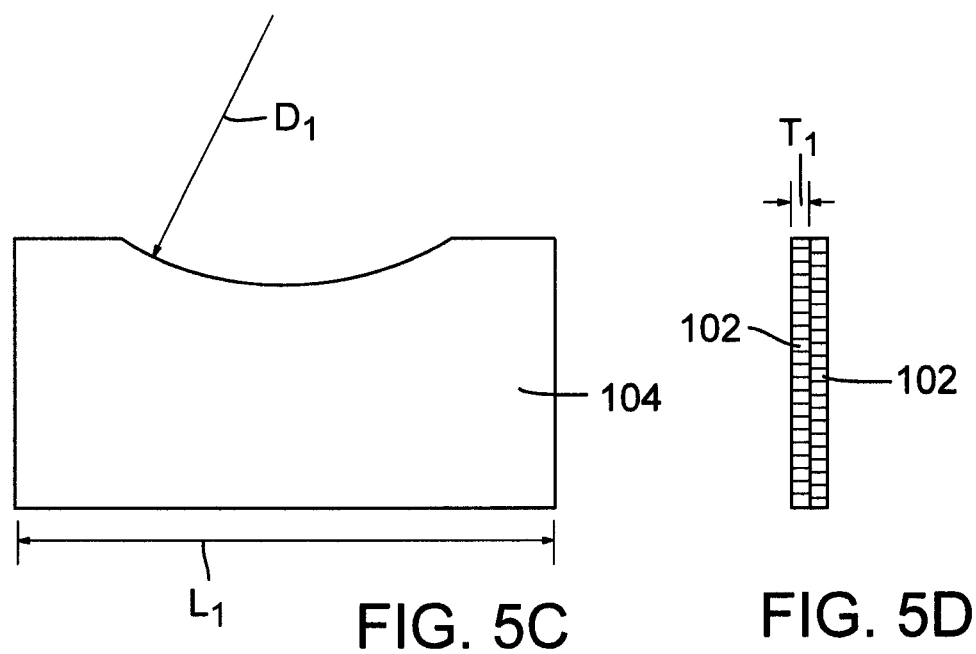
FIG. 5C
FIG. 5D

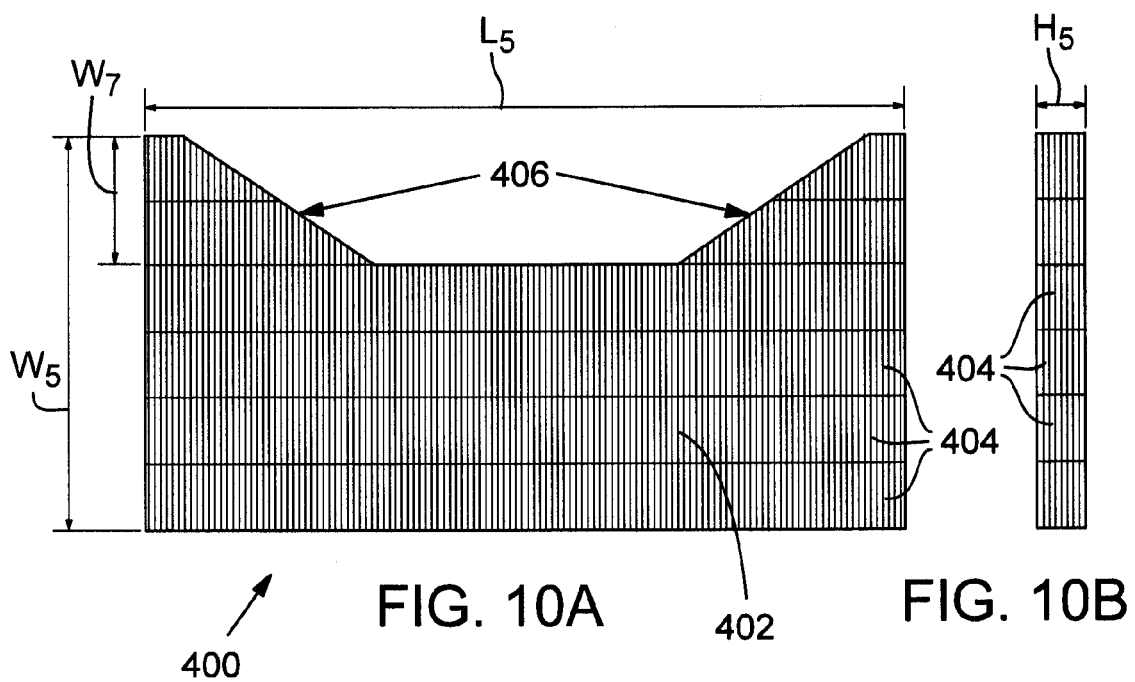

PAPER ROLL TRANSIT PAD

CROSS REFERENCE TO RELATED APPLICATIONS

This application claims the benefit of U.S. Provisional Patent Application No. 61/785,442, filed Mar. 14, 2013, which is hereby incorporated herein by reference in its entirety.

FIELD

The present disclosure relates to methods and devices for securing cylindrical goods in containers during transportation and more particularly to a pad for securing paper rolls for transport in freight containers.

BACKGROUND

Intermodal freight containers allow for the efficient movement of various goods by various modes of transportation globally. Freight containers can be provided in various sizes, which have largely become standardized, thereby increasing the efficiency of the global shipping system. Paper is often shipped in bulk in the form of large, continuous rolls of paper. These cylindrical paper rolls, like many other goods, are often shipped in intermodal freight containers of standardized sizes. There are government regulations pertaining to transport of such goods in freight containers.

SUMMARY

In some embodiments, a void filler for securing a paper roll in a freight container comprises a first facing paper, a second facing paper, and a honeycomb portion disposed between the first facing paper and the second facing paper, wherein the void filler has first and second sides and first and second ends, the first and second ends and the first side forming the shape of three sides of a rectangle, and the second side comprising a curve configured to accommodate the periphery of the paper roll, and wherein the first facing paper has a grain extending from the first side to the second side. In some cases, such a void filler further comprises a third facing paper, a fourth facing paper, and a honeycomb portion disposed between the third facing paper and the fourth facing paper, wherein a first surface of the second facing paper is adhered to a first surface of the third facing paper. In some such cases, the first surface of the second facing paper is adhered to the first surface of the third facing paper with a water-based glue.

In some cases, the curve of the second side of the void filler comprises a segment of a circle, and in some specific embodiments, the curve of the second side of the void filler comprises a segment of a circle having a diameter of between 40 inches and 70 inches. In some cases, a void filler can weigh less than 9 pounds, have a thickness of 3 inches, and/or a length of 48 inches.

In some embodiments, a method of securing an upright paper roll in a freight container having first and second side walls comprises positioning a first void filler between the upright paper roll and the first side wall of the freight container. In some cases, the paper roll is positioned against the second side wall. In some cases, the method further comprises positioning a second void filler between the upright paper roll and the second side wall of the freight container.

In some embodiments, a method of fabricating a void filler comprises providing a honeycomb-type cardboard member, removing a space from the center of the honeycomb-type cardboard member wherein the space has a shape comprising two curves each configured to accommodate the periphery of a paper roll, scoring one face of the honeycomb-type cardboard member along a centerline of the member forming a score line, folding the honeycomb-type cardboard member along the score line, thereby defining a first portion of the member on a first side of the fold and a second portion of the member on a second side of the fold, and gluing the first and second portions of the member to one another. In some such cases, the honeycomb-type cardboard member comprises a facing paper having a grain and the score line is perpendicular to the grain of the facing paper.

The foregoing and other objects and features of the disclosure will become more apparent from the following detailed description, which proceeds with reference to the accompanying figures.

BRIEF DESCRIPTION OF THE DRAWINGS

FIGS. 5A-5D show an exemplary method of making a void filler such as the void fillers shown in FIGS. 1-4.

FIGS. 10A-10B show top plan and side views, respectively, of an exemplary void filler formed from the portions shown in FIGS. 9A-9C.

DETAILED DESCRIPTION

Figure 1:
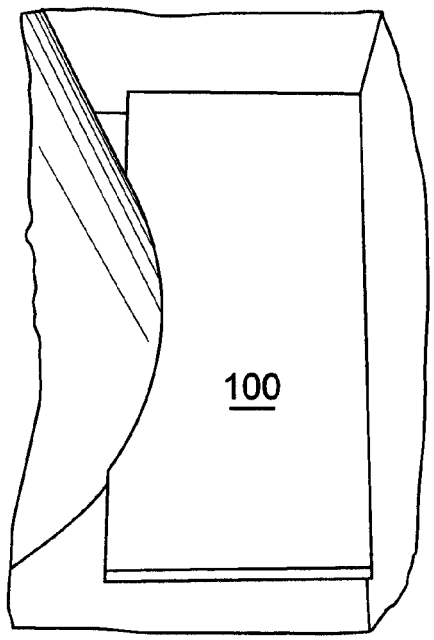
FIG. 1 shows an exemplary void filler in an exemplary configuration.

The explanations of terms and abbreviations herein are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing dimensions or quantities, properties such as crush strength, percentages, and so forth, as used in the specification or claims are to be understood as being modified by the term "about." Unless otherwise indicated, non-numerical properties, such as direction of a paper's grain, as used in the specification or claims are to be understood as being modified by the term "substantially," meaning to a great extent or degree. Accordingly, unless otherwise indicated, implicitly or explicitly, the numerical parameters and/or non-numerical properties set forth are approximations that may depend on the desired properties sought, limits of detection under standard test conditions/methods, limitations of the processing method, and/or the nature of the parameter or property. When directly and explicitly distinguishing embodiments from discussed prior art, the embodiment numbers are not approximates unless the word "about" is recited.

Paper can be shipped in bulk in the form of a cylindrical paper roll, which can include a long, continuous sheet of paper that has been rolled up, or several sheets of paper that have been rolled up together. In any case, a paper roll can have a generally cylindrical shape, having a height that depends on the width of the rolled paper and a diameter that depends on the characteristics and length(s) of the paper, which was rolled into the paper roll. A paper roll can thus have a central longitudinal axis extending along the length of its cylindrical shape and being defined as extending from the center of one of its circular ends to the center of the other of its circular ends. The length and/or diameter of the cylindrical shape of a paper roll can be affected by any packaging that immediately surrounds and/or contacts the paper itself.

Paper rolls can be stored and/or transported in various freight (or "shipping") containers in various arrangements, with individual paper rolls in various positions and/or orientations. For example, paper rolls can be stored and transported in a freight container having a generally rectangular shape in plan view with one dimension (the container's "length," extending between first and second "ends" of the container) being longer than the other dimension (the container's "width," extending between first and second "sides" of the container). The "height" of a freight container is the dimension of the freight container perpendicular to its width and length. The "center" of a freight container, as that term is used in this application, refers to the line of symmetry which exists along the container's length, that is, the line extending from the center of one end to the center of the other end of the container. A paper roll can be oriented within such a container in an upright configuration, that is, so that its central longitudinal axis is perpendicular to the container's length and width. In some cases, the width of a freight container can be greater than the diameter of a paper roll stored within it. Thus, when a paper roll is stored in a freight container, a void can exist between one or both sides of the freight container and the surface of the paper roll.

Thus, it is possible for paper rolls to be loaded off-center in a freight container. That is, a paper roll can be loaded closer to a first side than to a second side, or in contact with the first side, leaving a void between the paper roll and the second side. In some cases, this allows for storage of paper rolls by staggering them in a container. In any arrangement of paper rolls in a freight container, however, it can be important that the weight of the paper rolls be balanced about the center of the container, to prevent tipping of the container, inefficient transportation of the container, or other problems. Thus, in some arrangements of paper rolls in freight containers, at least one of the paper rolls can be centered within the container, thereby forming a pair of voids, one between each of the sides of the container and the surface of the paper roll.

Void fillers can be used to fill a single void between a paper roll and a wall of a container (e.g., where the paper roll is in contact with the other wall), or to fill a pair of voids (e.g., where the paper roll is centered in a container), thereby helping to ensure that a paper roll remains restrained in a desired position throughout shipping and handling of the freight container, which in some cases can cause movement of unrestrained paper rolls. Void fillers can be formed from various materials, and can be formed in any of various sizes. As used herein, the "length" of a void filler is the distance it spans in the direction of the length of the container, the "width" of a void filler is the distance it spans in the direction of the width of the container, and the thickness (or height) of a void filler is the distance it spans in the direction perpendicular to its length and its width.

It is desirable to reduce the material used to form void fillers to reduce cost and waste. Void fillers must be sufficiently strong to prevent paper rolls from sliding within a container during transport. The Association of American Railroads ("AAR") has created Circular 43-D, titled "Rules Governing the Loading, Blocking and Bracing of Freight in Closed Trailers and Containers for TOFC/COFC Service." This document includes Method E-18, titled "Split Loads of 58" Diameter Roll Pulpboard on End Using 3' Wide Rubber Mats," which provides guidance regarding the positioning and securing of paper rolls having particular diameters within a freight container.

Specifically, Method E-18 states:
4. If 3 rolls are loaded in the nose section, load the first roll so it is centered in the trailer against the nose. Place void fillers, 3"×(void width)×48" corrugated fiberboard 1,500 lbs. minimum crush strength, on both sides of the first roll between roll and trailer walls. Position void fillers so that the crush strength is crosswise to the trailer or container. If using multiple void fillers in tandem, unitize them to restrict independent movement. See Sketch 3. Lumber side blocking can be used as an alternative to the void fillers provided it is 3" in height, extends a minimum of 48" from the nose of the trailer and is secured adequately using 12d nails. Ladder type lumber side blocking may also be used as an alternative provided it is 3" in height and extends a minimum of 48" from the nose.

Embodiments of the presently disclosed void fillers are designed to meet the regulation requirements while also allowing for a light weight, relatively small but sufficiently strong device formed using minimal materials such that it is economically produced and environmentally advantageous.

FIGS. 1-4 show exemplary void fillers 100 that comply with method E-18 of Circular 43-D while also providing one or more of the advantages listed above. As shown, a void filler 100 comprises a first facing paper, a second facing paper, and a honeycomb portion disposed between the first facing paper and the second facing paper. The void filler has first and second sides and first and second ends. The first and second ends and the first side of the void filler form the shape of three sides of a rectangle, and the second side comprises a curve configured to accommodate the periphery of a paper roll. The first and/or the second facing paper can have a grain extending from the first side to the second side of the void filler. The void filler 100 is dimensioned as desired for particular paper rolls and freight containers. For example, certain embodiments have a length of 48 inches, a maximum width of 24 inches, and a thickness of 3 inches. The curve of the second side of the void filler 100 can comprise a segment of a circle extending into the void filler 100 a distance, which distance can depend on the width of the container in which the void filler 100 is intended to be used. The segment of a circle extending into the otherwise rectangular void filler can be configured to accommodate the periphery of a paper roll stored in a freight container.

For example, if the diameter of a paper roll to be secured is 58 inches and the width of the interior of a container is 96 inches (8 feet), then the segment of the circle can extend 5 inches into the side of a rectangular void filler having a width of 24 inches, making the minimum width of the void filler 19 inches and making the total width of two 19 inch void fillers and a 58 inch paper roll the same width as the 96 inch wide container. In alternative embodiments, the rectangular shape of the void filler can have any appropriate width, which width can be greater than or less than 24 inches, and can have a segment of a circle extending into one of its sides to accommodate the specific dimensions of the container in which it is intended to be used. Further, void fillers can be provided that are intended for use with paper rolls of greater or less than a 58 inch diameter by adjusting the geometry of the void filler (including its width and the dimensions of the segment of the circle extending into its otherwise rectangular shape).

As best illustrated in FIGS. 4 and 5A-D, a void filler 100 can be formed from two honeycomb-type cardboard members 102 forming two layers of the void filler 100. Such a product is commercially available, for example from the Hexacomb Corporation (Buffalo Grove, Ill.) under the trade name HEXACOMB.® The honeycomb-type cardboard members can include a first layer of facing paper 104, a second layer of facing paper 106 spaced apart from the first layer 104, and a series of pieces of paper spanning the space between the two layers forming the honeycomb-shaped members and being in a substantially honeycomb-shaped arrangement 108. The two layers of facing paper can be formed from a heavy grade paper, for example a 56 lb liner paper. In alternative embodiments, a heavier paper, such as a 90 lb liner paper, or a lighter paper can be used. Any of the components of the void filler 100 can be formed from various types of paper, for example, virgin kraft paper or recycled paper. Such paper is commercially available, such as from the Packaging Corporation of America (Lake Forest, Ill.). The honeycomb-type cardboard members 102 may be of various thicknesses such as 1½ inches thick, such that the two layered members 102 together are 3 inches thick. The two honeycomb-type cardboard members 102 are adhered to one another, such as via lamination or gluing, for example, using a commercially available glue, such as a polyvinyl acetate (PVA) glue. In alternative embodiments, more than two layers of the honeycomb-type cardboard members 102 are adhered one on top of the next, for example three members 102, four members 102, five members 102, or more depending upon the strength desired for the void filler.

In certain embodiments, the void filler 100 is capable of carrying a load needed to prohibit, substantially prohibit or to inhibit movement of a paper roll in a freight container, such as during transit in the freight container. In certain embodiments, the void filler 100 has two honeycomb-type cardboard members 102, each honeycomb-type cardboard member 102 has two layers of facing paper (arranged as described above), and thus the void filler 100 has four total layers of facing paper. In some cases, three of these four layers of facing paper are capable of carrying loads such that movement of the paper roll is prohibited or substantially prohibited. For example, both facing papers of the top cardboard member 102 (the member 102 not in contact with the floor of the container) and the top facing paper of the bottom cardboard member 102 (the member 102 in contact with the floor of the container) can be capable of engaging the exterior of the paper roll to inhibit its lateral movement. In some embodiments, the void filler 100 is configured such that the grain (i.e., the general direction in which the fibers of the paper are oriented, typically the "machine direction," as that term is understood in the art) of the facing papers is oriented along the width of the void filler 100, making the void filler 100 stronger along its width than if the grain of the facing papers was not oriented in this direction.

Embodiments of void fillers comprising honeycomb-type cardboard members and having the grain of the facing paper oriented along their width can provide distinct advantages over the use of conventional corrugated cardboard. For example, in some cases, conventional corrugated cardboard can comprise two facing papers and a series of flutes disposed between the two facing papers, and the grain of the facing papers can be perpendicular to the direction of the flutes. That is, void fillers comprising conventional corrugated cardboard are not as strong as those comprising honeycomb-type cardboard members as described herein, and often do not take advantage of the increased strength of the facing paper in the direction of its grain. Thus, void fillers formed from conventional corrugated cardboard require a significantly greater amount of cardboard material to achieve adequate strength for use as a void filler. This adds in cost, waste and weight of the void filler. Accordingly, the presently disclosed void fillers formed using honeycomb-type cardboard members and having the grain of the facing paper oriented in the direction of the width of the void filler provide equal or greater strength than conventional corrugated cardboard void fillers, while using less raw material, costing less and weighing less. It has been found that a void filler 100 designed for use with paper rolls having a 58 inch diameter can be fabricated to have an overall weight of not more than 7.3 lbs, and that a similar void filler designed for use with paper rolls having a 54 inch diameter can be fabricated to have an overall weight of not more than 8.3 lbs.

The crush strength of paper, as measured in accordance with various standardized test methods (some of which are described in more detail below) is typically higher along the grain of the paper (i.e., in the "machine direction" or "MD") than against the grain of the paper (i.e., in the "cross machine direction" or "CD"). In some cases, the crush strength of paper can be measured in accordance with any one of various suitable tests such as two that are well established in the paper industry: the STFI Short Span Compressive Test (STFI) and the Ring Crush Test (RCT). Standardized test protocols are available from, for example, the Technical Association of the Pulp and Paper Industry ("TAPPI"), such as TAPPI T-822, titled "Ring Crush of Paperboard (Rigid Support Method)." This standard generally describes forming a specimen of paper to be tested into a ring form, and compressing the specimen until it collapses.

In some cases, the MD crush strength of facing paper used to fabricate the void fillers described herein, as tested in accordance with a standardized test, can be significantly higher than the CD strength of the facing paper, such as between 1.5 and 2.5 times higher, or 2 times higher. Thus, by forming the void filler 100 such that the grain of the facing paper is oriented along the width of the void filler, the crush strength of the void filler along its width can be increased significantly.

TAPPI publishes standardized test protocols for testing the crush strength of corrugated fiberboard, such as TAPPI T-811, titled "Edgewise Compressive Strength of Corrugated Fiberboard (Short Column Test)." This standard generally describes compressing a section of corrugated fiberboard to be tested until it collapses, and recording the maximum force exerted prior to collapse. Section 3, titled "apparatus," section 6, titled "test specimens," and section 7, titled "procedure," are provided here for convenience.

3. Apparatus 3.1 Compression testing machine meeting the requirements of either 3.1.1 or 3.1.2, and 3.1.3, 3.1.4, and 3.1.5. (Names of suppliers of testing equipment and materials for this method may be found on the Test Equipment Suppliers list, available as part of the CD or printed set of Standards, or on the TAPPI website general Standards page.)

3.1.1 Rigid Support Compression Tester. Two platens, one rigidly supported and the other driven. Each platen shall have a working area of approximately 100 cm$^2$ (16 in.$^2$). The platens must not have more than 0.050 mm (0.002 in.) lateral relative movement, and the rigidly supported platen not more than 0.150 mm (0.006 in.) movement, perpendicular to the surface, within a load range of 0 to 2224 N (0-500 lbf). Within the specimen contact area, each platen shall be flat within 0.0025 mm (0.0001 in.) of the mean platen surface, and the platens shall remain parallel to each other within 1 part in 2000 throughout the test (6).

3.1.1.1 Within a range of platen separations necessary to cause compressive failure of the test specimen, and within a load range of 0 to 2224 N (0-500 lbf), the speed of the driven platen shall be controllable at 12.5±0.25 mm (0.5±0.01 in.) per minute. (For convenience, the test machine should be capable of rapid return and automatic, settable positioning).

3.1.2 Flexible Beam Compression Tester. Two platens, one flexible beam supported and the other driven. Each platen shall have a working area of approximately 100 cm$^2$ (16 in.$^2$). Within the specimen contact area, each platen shall be flat within 0.0025 mm (0.0001 in.) of the mean platen surface, and the platens shall remain parallel to each other within 1 part in 2000 throughout the test. The platens must not have more than 0.050 mm (0.002 in.) lateral relative movement.

3.1.2.1 Within a range of platen separations necessary to cause compressive failure of the test specimen, and within a load range of 0 to 2224 N (0-500 lbf), the speed of the driven platen shall be controlled so that the rate of force increase (without considering specimen deformation) is 111±22 N/s (25±5 lbf/s) (6).

3.1.3 The driven platen shall be moveable to achieve an initial platen separation of at least 60 mm (2.36 in.).

3.1.4 The tester shall have a capacity of at least 2224 N (500 lbf).

3.1.5 The tester shall have a means for measuring and indicating the maximum load sustained by the test specimen with an accuracy of 0.5% or better between a measured load of 440 N (100 lb) and the equipment's maximum load. Below this measured load, the accuracy shall be 2.2 N (0.5 lbf), or better.

3.2 A means such as a saw or other device for cutting specimens having clean, parallel and perpendicular edges, within the tolerances specified in 6.2 and 6.3. Opposite edges shall be parallel to each other and perpendicular to adjacent edges (7, 8).

3.2.1 Knife cutter, single knife device with guides or, preferably, a twin-knife motorized or pneumatically driven device to cut the test specimens according to the specifications in Section 6. The knives must be sharp and of the single-bevel type and arranged in the device so that the unbevelled side is toward the test piece and at 90° to the specimen's surface.

3.2.2 Saw, circular, equipped with a sharp, no-set (hollow ground or taper ground is desirable) saw blade. The saw blade shall be 90° to the table supporting the specimen.

3.3 A means for supporting the specimen at the initiation of the test so that the applied force is parallel to the flutes.

3.3.1 Metal guide blocks (FIG. 1) to be used with the waxed edge specimens (7.5). Two are required to align the specimen vertically in the testing machine.

6. Test Specimens 6.1 From each test unit accurately cut at least 10 specimens with the motorized knife or circular saw or other method that will cut clean, parallel, and perpendicular edges.

6.1.1 Sample away from scorelines, joints, and closures. Specimens should be representative of the materials being tested. For example, if roughly 25% of a box is printed, roughly 25% of the samples should be collected from the printed areas. Specimens should not be taken from obviously damaged areas and/or areas not representative of the container as a whole.

Figure 2:
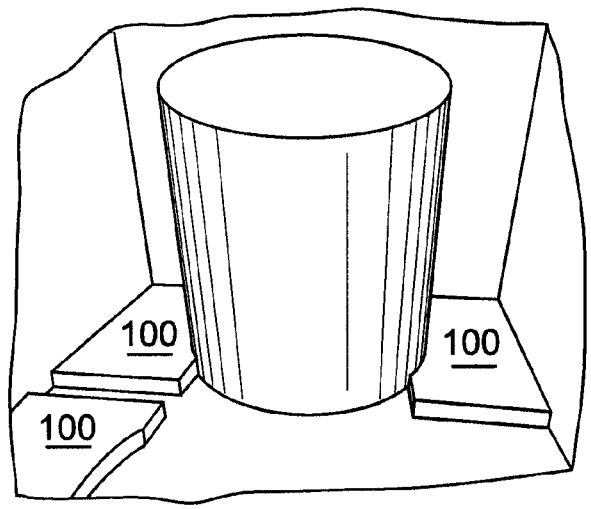
FIG. 2 shows three exemplary void fillers in an exemplary configuration.
Figure 3:
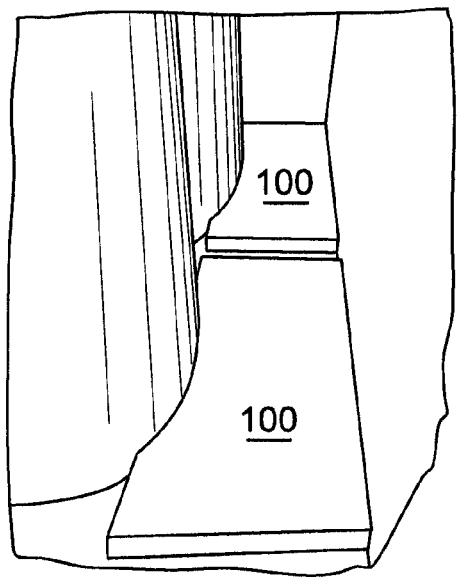
FIG. 3 shows two exemplary void fillers in an exemplary configuration.
Figure 4:
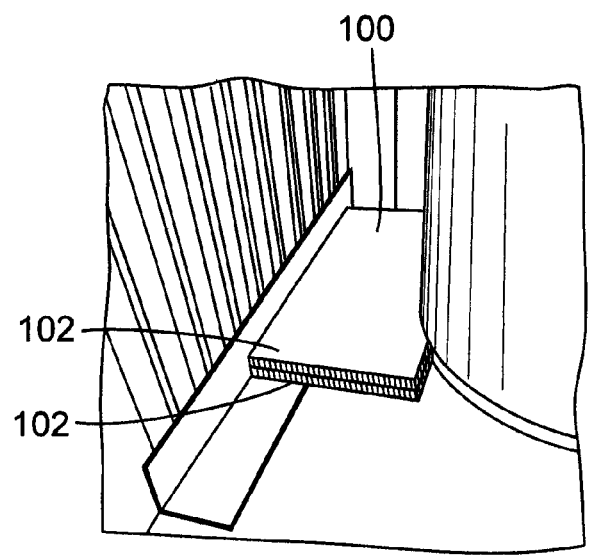
FIG. 4 shows an exemplary void filler in an exemplary configuration.

6.2 Cut the specimens to a width of 50.8±0.8 mm (2.00±0.03 in.) so that the loading (width) edges are parallel to each other and perpendicular to the axis of the flutes (FIG. 2).

6.3 Cut the specimens to a height of 31.8±1.6 mm (1.25±0.06 in.) for B-flute, 38.1±1.6 mm (1.50+0.06 in.) for C-flute, and 50.8±1.6 mm (2.00±0.06 in.) for A-flute and typical-double- and triple-wall board (1, 6). These heights meet the Euler criteria for pure compression failure in a short column for their respective structures (8). For some thin double-wall board (e.g., EB double-wall), and for other flute structures (e.g., E flute), different heights may be required to achieve a pure compression failure in the test specimens.

Note 1. In some U.S. Federal and Military Specifications and Standards for corrugated board, the short column crush test is required. The procedure is technically identical to that described here in Sections 4-6 except for specimen size. The height for all flute constructions, single-, double-, and triple-wall, is 31.8±1.6 mm (1.25±0.06 in.). When testing against these specifications, this height is to be used and should be mentioned explicitly in the report.

Note 2. In some testing protocols (e.g., compliance with National Motor Freight Classification item 222), alternate numbers of specimens may be required for testing. The test procedure is technically identical to that described here in Sections 4-7.

Note 3. Other procedures are sometimes used which require different specimen dimensions, specimen geometry (10), or specimen support techniques. These may include, but are not limited to: TAPPI T 839 "Edgewise Compressive Strength of Corrugated Fiberboard using the Clamp Method (Short Column Test)" (11), TAPPI T 841 "Edgewise Compressive Strength of Corrugated Fiberboard using the Morris Method (Short Column Test)", TAPPI T 838 "Edge Crush Test Using Neckdown" (12), and FEFCO test Method No. 8 "Edgewise Crush Resistance of Corrugated Fiberboard." The FEFCO method requires testing specimens cut to 100 mm (3.94 in.) wide and 25 mm (0.98 in.) high without any additional specimen support such as waxed edges, or mechanical support beyond the initial vertical alignment.

The procedures described in Notes 1, 2, and 3 will not necessarily yield the same results as this test method. (13, 14)

6.4 Prepare test specimens with waxed edge reinforcement as follows: Dip each loading edge in molten paraffin at 69-74° C. (156-165° F.) approximate melting point, 52° C. (125° F.), to a depth of 6 mm (¼ in.) and hold there until the absorbed paraffin, as determined visually, begins to migrate above the 6 mm (¼ in.) dipped zone. Normally, a 3 second dip in molten paraffin is satisfactory. If excessively rapid migration is encountered, reduce the temperature of the molten paraffin. Immediately after dipping, momentarily blot the loading edges of the specimen on paper toweling preheated on a hot plate maintained at 77-82° C. (171°-180° F.).

Note 4. The following alternative procedure for impregnating the loading edges of specimens with paraffin wax is permissible. Place the edge on a paraffin wax saturated pad, such as paper toweling, heated on a hot plate maintained at 77-82° C. (171-180° F.) until the paraffin wax impregnates the specimen to the desired 6 mm (¼ in.) depth. Generally, this method is slower than the dipping method and therefore permits better control of the depth of paraffin wax penetration for specimens in which paraffin wax migration is rapid.

Note 5. When reinforcing the loading edges of waxed or curtain coated boards, take care that the heat of the reinforcing paraffin wax does not adversely affect the integrity of the board's structure in the area of the edge wax impregnation. Evidence of proper treatment will be that in performing the test, failure occurs away from the reinforced area.

7. Procedure 7.1 Perform all tests in the conditioning atmosphere.

7.2 The rate of platen movement required for a flexible beam compression machine has been determined to be 111±22 N/s (25±5 lbf/s). Record the platen movement rate actually used. On most machines this rate of platen movement will be 13-51 mm (0.5-2.0 in.) per minute depending on the load range at the beam.

7.3 Set the rate of platen movement for each rigid support compression machine to 12.5±0.25 mm (0.5±0.01 in.) per minute.

7.4 Measure the width (nominally 50.8-mm (2-in.)) dimension of each specimen to the nearest 1 mm (⅓₂ in.).

7.5 Center the specimen on the platen. Place a guide block on each side of the specimen centrally located relative to it so that the flutes are held perpendicular to the platen. Place the blocks' largest faces up, with the offset ends adjacent and in contact with the specimen above the paraffin areas.

7.5.1 Apply a compressive force to the specimen. Verify the platen movement rate described in 7.2 or 7.3. When the force on the specimen is between 22 and 67 N (5 and 15 lbf), remove both guide blocks and, without altering the platen movement rate, continue to apply force until the specimen fails. A valid test is when one or both liners have buckled in the unwaxed center portion of the specimen. If neither liner shows a buckling failure in the unwaxed area of the specimen, or if failure occurs in the waxed portion of the sample, declare the test invalid.

7.6 Record the maximum load in newtons (pounds-force), the specimen width, and whether or not the specimen exhibited a valid failure.

It has been found that the void fillers described herein can be fabricated using significantly less raw material than conventional void fillers, such as those comprising conventional corrugated cardboard, while retaining sufficient crush strength to be used as a void filler in accordance with method E-18 of AAR Circular 43-D.

FIGS. 5A-5D show one exemplary method of making a void filler such as the void filler 100 illustrated in FIGS. 1-4. As shown, a honeycomb-type cardboard member having various dimensions such as $L_1$ (in some cases, 48 inches) by $W_1$ (in some cases, 48 inches), various thicknesses such as a thickness $T_1$ (in some cases, 1½ inches), and a centerline 110 extending from the center of one end of the cardboard member to the center of the opposing end of the cardboard member can be provided. The honeycomb-type cardboard member can then be die-cut to remove a space 112 from the cardboard member. The space 112 can be defined by two segments of circles each having a diameter $D_1$ (in some cases, 58 inches) and arranged so the space 112 is symmetrical about the centerline 110. A first facing paper of the cardboard member can then be scored along the remaining portions of the centerline 110, and the cardboard member can then be folded along its centerline 110 so that a second facing paper of the cardboard member is bent over on itself, thereby defining a first portion of the member on a first side of the fold and a second portion of the member on a second side of the fold. The two portions of the member can then be adhered to one another, such as by gluing, to form void filler 100.

Figure 6:
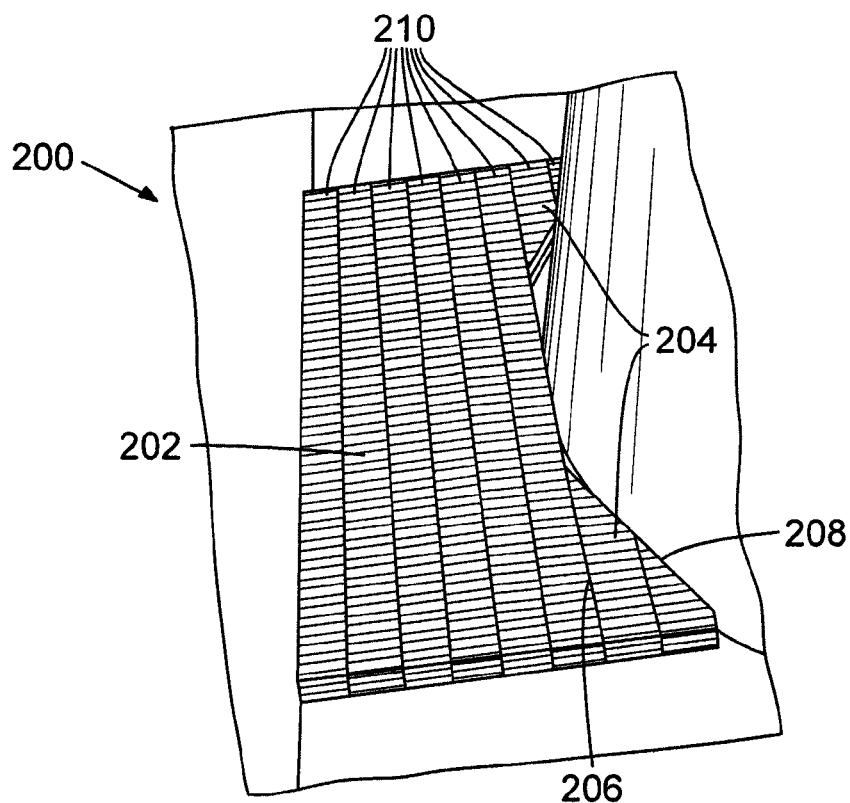
FIG. 6 shows an exemplary void filler in an exemplary configuration.

FIGS. 6-10 show void fillers having other exemplary configurations. FIG. 6 shows a void filler 200 that comprises a rectangular-shaped body 202 formed of a plurality of individual honeycomb-type cardboard strips 210, and two wedge shaped extensions 204 formed of a plurality of honeycomb-type cardboard strips 210. In certain embodiments, the extensions 204 can have a first side 206 that is coupled to the body 202, and an angled edge 208 that is designed to contact a paper roll when the void filler is used in a freight container. Thus, the void filler 200 can be configured to accommodate the periphery of a paper roll in a manner similar to that for the void filler 100.

The void filler 200 can be formed from honeycomb-type cardboard members having two facing papers as described above, with the facing papers oriented along different axes from those illustrated for void filler 100. Specifically, the cardboard members of void filler 200 have facing papers that extend along the length and height of the void filler 200 (i.e., along the length and height of a freight container when in use in a freight container), whereas the void filler 100 has facing paper that extends along the length and width of the void filler 100 (i.e., along the length and width of a freight container when in use in a freight container).

Thus, in void filler 100, the facing papers and the papers spanning between the facing papers in a honeycomb-shaped arrangement can help to prohibit, substantially prohibit, or to inhibit movement of a paper roll in a freight container. In void filler 200, the papers spanning between the facing papers in a honeycomb-shaped arrangement are the primary means by which a paper roll in a freight container is restrained, while the facing papers can serve primarily to stabilize these papers. It has been found that void filler 200 has cost advantages for fabrication and void filler 100 provides surprisingly superior strength compared to void fillers formed of conventional corrugated cardboard.

Figure 7A:
FIGS. 7A-7C show portions of an exemplary void filler similar to the void filler of FIG. 6.
Figure 7B:
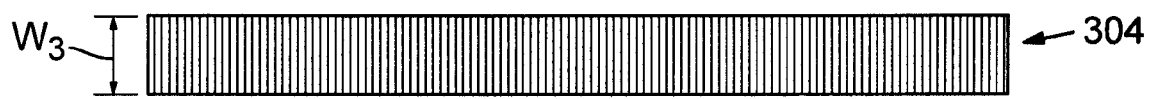
Figure 7C:
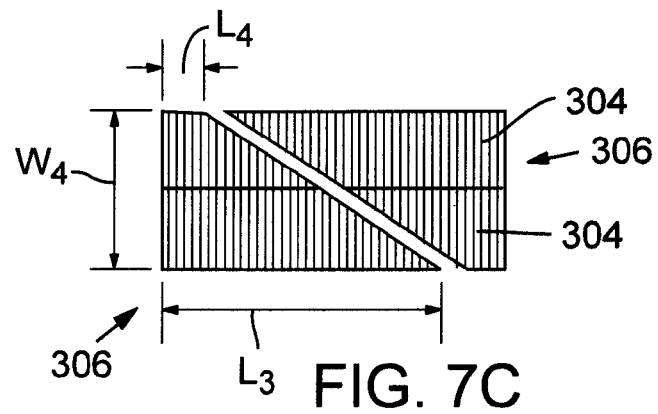
Figures 8A, 8B:
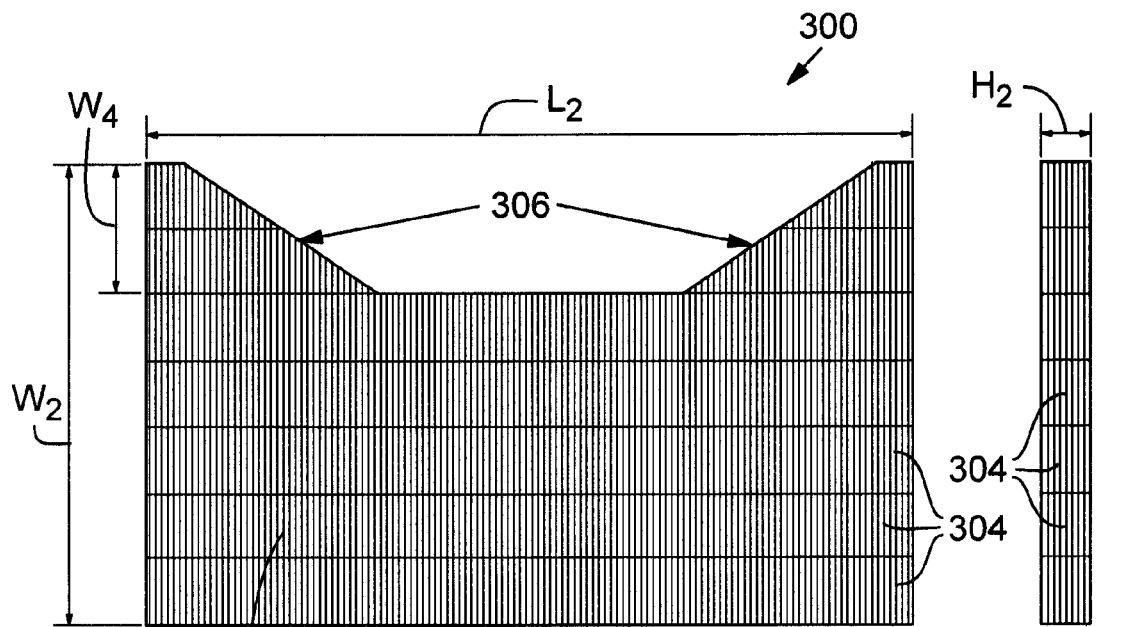
FIGS. 8A-8B show top plan and side views, respectively, of an exemplary void filler formed from the portions shown in FIGS. 7A-7C.

FIGS. 7A-C and 8A-B show a void filler 300 having a configuration resembling that illustrated in FIG. 6. The void filler 300 can have an overall length $L_2$ (in some cases, 46"), height $H_2$ (in some cases, 3"), and width $W_2$ (in some cases, 28") (see FIG. 8). In alternative embodiments, the illustrated void filler 300 can have various other specific dimensions, for example, an overall length of 48". The illustrated void filler 300 can have a rectangular body 302 that comprises five honeycomb-type cardboard strips 304 of length $L_2$ (in some cases, 46"), height $H_2$ (in some cases, 3"), and width $W_3$ (in some cases, 4") (see FIGS. 7A and 7B showing side and top views, respectively). The void filler 300 shown in FIGS. 7A-C and 8A-B can also comprise two wedge shaped extensions 306 (formed, e.g., of two or more honeycomb-type cardboard strips 304). A wedge shaped extension 306 can have a first length $L_3$ (in some cases, 14 inches), a second length $L_4$ (in some cases, 2 inches) and a width $W_4$ (in some cases, 8 inches).

Figure 9A:
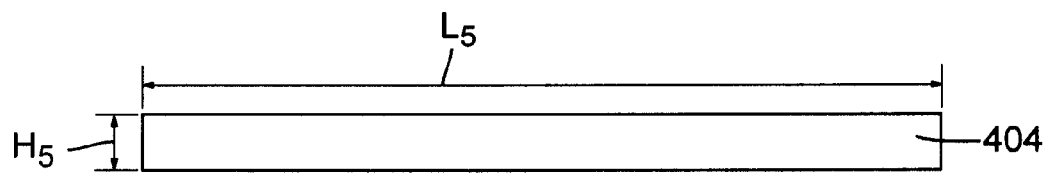
FIGS. 9A-9C show portions of an exemplary void filler similar to the void filler of FIG. 6.
Figure 9B:
Figure 9C:
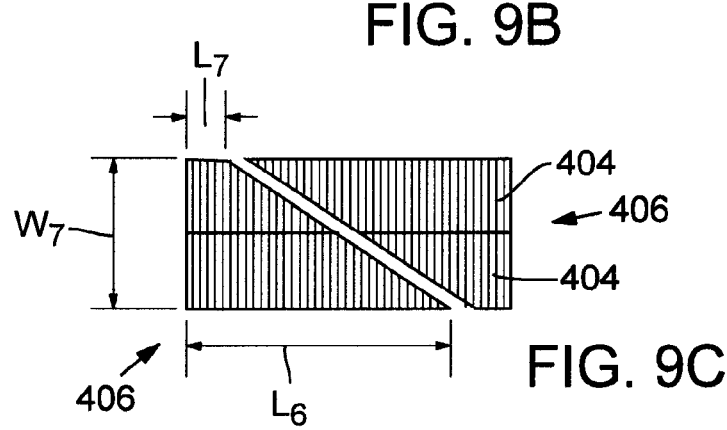

FIGS. 9A-C and 10A-B show a void filler 400 having a configuration resembling that illustrated in FIG. 6. The void filler 400 can have an overall length $L_5$ (in some cases, 44"), height $H_5$ (in some cases, 3"), and width $W_5$ (in some cases, 24") (see FIG. 10). In alternative embodiments, the illustrated void filler 400 can have various other specific dimensions, for example, an overall length of 48". The illustrated void filler 400 can have a rectangular body 402 that comprises four or more honeycomb-type cardboard strips 404 of width $W_6$ (in some cases, 4 inches) (see FIGS. 9A and 9B, showing side and top views, respectively). The void filler 400 shown in FIGS. 9A-C and 10A-B can also comprise two wedge shaped extensions 406 (formed from two or more honeycomb-type cardboard strips 404). A wedge shaped extension 406 can have a first length $L_6$ (in some cases, 14 inches), a second length $L_7$ (in some cases, 2 inches) and a width $W_7$ (in some cases, 8 inches).

The void fillers described herein are surprisingly more efficient (e.g., in terms of strength per total weight or strength per density) than other known void fillers. The void fillers described herein can be formed from less raw material while achieving desired dimensions and strengths. The void fillers described herein weigh less than known void fillers, such as conventional corrugated cardboard void fillers, and are easier and less expensive to transport, move, install, and/or use. For example, it has been found that void fillers as described herein can weigh 5 lbs. and have sufficient strength to support at least a pressure of 22 psi and meet the AAR standards, while previous void fillers meeting the AAR standards weigh approximately 8.5 lbs. Thus, when used in accordance with AAR standards, the presently described void fillers can provide substantial materials and cost savings. The presently described void fillers can also be less expensive to customers that purchase the same as compared to known void fillers.

The void fillers described herein can be more environmentally friendly ("sustainable," or "green") than other known void fillers. This can be due in part to their reduced use of raw materials and reduced weight. The portions of honeycomb-type cardboard that are coupled to one another to form a void filler can also be glued to one another using, for example, a water-based glue, making the void filler fully recyclable. This can make the void fillers described herein more environmentally friendly by reducing total waste.

A pair of void fillers as described herein (e.g., two void fillers 100, or two void fillers 200, or one void filler 100 and one void filler 200) can be used to retain a paper roll centered in a freight container. In alternative embodiments, a void filler can be configured to be used to ensure that a paper roll remains in any predetermined or desired position within a freight container. For example, by modifying the geometry of any of the void fillers described herein, an alternative void filler can be configured to ensure that a paper roll remains in a position against one of the side walls of a freight container.

Using a void filler to help ensure that an upright paper roll remains centered in a freight container can be more efficient than using other known systems to help ensure a paper roll that is oriented on its side remains in a predetermined or desired position within a freight container. In some cases this can be due in part to the fact that an upright paper roll is partially restrained to its position by friction between it and the floor of the freight container to a larger degree than is a paper roll oriented on its side.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A device comprising:
  a void filler for securing a paper roll in a freight container, the void filler comprising:
    a first facing paper;
    a second facing paper; and
    a honeycomb portion disposed between the first facing paper and the second facing paper;
    wherein the void filler has first and second sides and first and second ends, the first and second ends and the first side forming the shape of three sides of a rectangle, and the second side comprising a curve configured to accommodate a portion of a periphery of the paper roll;
    wherein the first facing paper and the second facing paper have an edge disposed on the second side of the void filler abutting the portion of the periphery of the paper roll;
    and wherein the first facing paper has a grain extending from the first side to the second side.

2. The device of claim 1, further comprising:
  a third facing paper;
  a fourth facing paper; and
  a honeycomb portion disposed between the third facing paper and the fourth facing paper;
  wherein a first surface of the second facing paper is adhered to a first surface of the third facing paper.

3. The device of claim 2, wherein the first surface of the second facing paper is adhered to the first surface of the third facing paper with a water-based glue.

4. The device of claim 1, wherein the curve comprises a segment of a circle.

5. The device of claim 4, wherein the segment of the circle comprises a segment of a circle having a diameter of between 40 inches and 70 inches.

6. The device of claim 5, wherein the device weighs less than 9 pounds.

7. The device of claim 6, wherein the device has a thickness of 3 inches and a length of 48 inches.

8. A method comprising:
  securing an upright paper roll in a freight container having first and second side walls, wherein:
  the act of securing comprises positioning a first void filler between the upright paper roll and the first side wall of the freight container; and
  the first void filler comprises:
    a first facing paper;
    a second facing paper; and
    a honeycomb portion disposed between the first facing paper and the second facing paper;
    wherein the void filler has first and second sides and first and second ends, the first and second ends and the first side of the void filler forming the shape of three sides of a rectangle, and the second side of the void filler comprising a curve configured to accommodate a portion of a periphery of the paper roll;
    wherein the first facing paper and the second facing paper have an edge disposed on the second side of the void filler abutting the portion of the periphery of the paper roll;
    and wherein the first facing paper has a grain extending from the first side of the void filler to the second side of the void filler.

9. The method of claim 8, wherein the upright paper roll is positioned against the second side wall.

10. The method of claim 8, wherein:
  the act of securing further comprises positioning a second void filler between the upright paper roll and the second side wall of the freight container.

11. A method comprising:
  fabricating a void filler, wherein the act of fabricating the void filler comprises:

providing a honeycomb-type cardboard member;

creating an opening by removing a portion from the center of the honeycomb-type cardboard member, wherein the opening has a shape comprising two curves, wherein each of the two curves is configured to accommodate a portion of a periphery of a paper roll;

scoring one face of the honeycomb-type cardboard member along a centerline of the member forming a score line;

folding the honeycomb-type cardboard member along the score line, thereby defining a first portion of the member on a first side of the fold and a second portion of the member on a second side of the fold; and gluing the first and second portions of the member to one another.

12. The method of claim 11, wherein:

the honeycomb-type cardboard member comprises a facing paper having a grain; and the score line is perpendicular to the grain of the facing paper.

13. The method of claim 11, wherein, after the act of fabricating the void filler, the void filler comprises:

a first facing paper;

a second facing paper; and a honeycomb portion disposed between the first facing paper and the second facing paper;

wherein the void filler has first and second sides and first and second ends, the first and second ends and the first side forming the shape of three sides of a rectangle, and the second side comprising a curve configured to accommodate a portion of a periphery of a paper roll;

wherein the first facing paper and the second facing paper have an edge disposed on the second side of the void filler abutting the portion of the periphery of the paper roll;

and wherein the first facing paper has a grain extending from the first side to the second side.

14. The device of claim 1, wherein the first facing paper and the second facing paper each have an edge disposed on the second side of the void filler abutting the portion of the periphery of the paper roll.

* * * * *